Figure 1A:
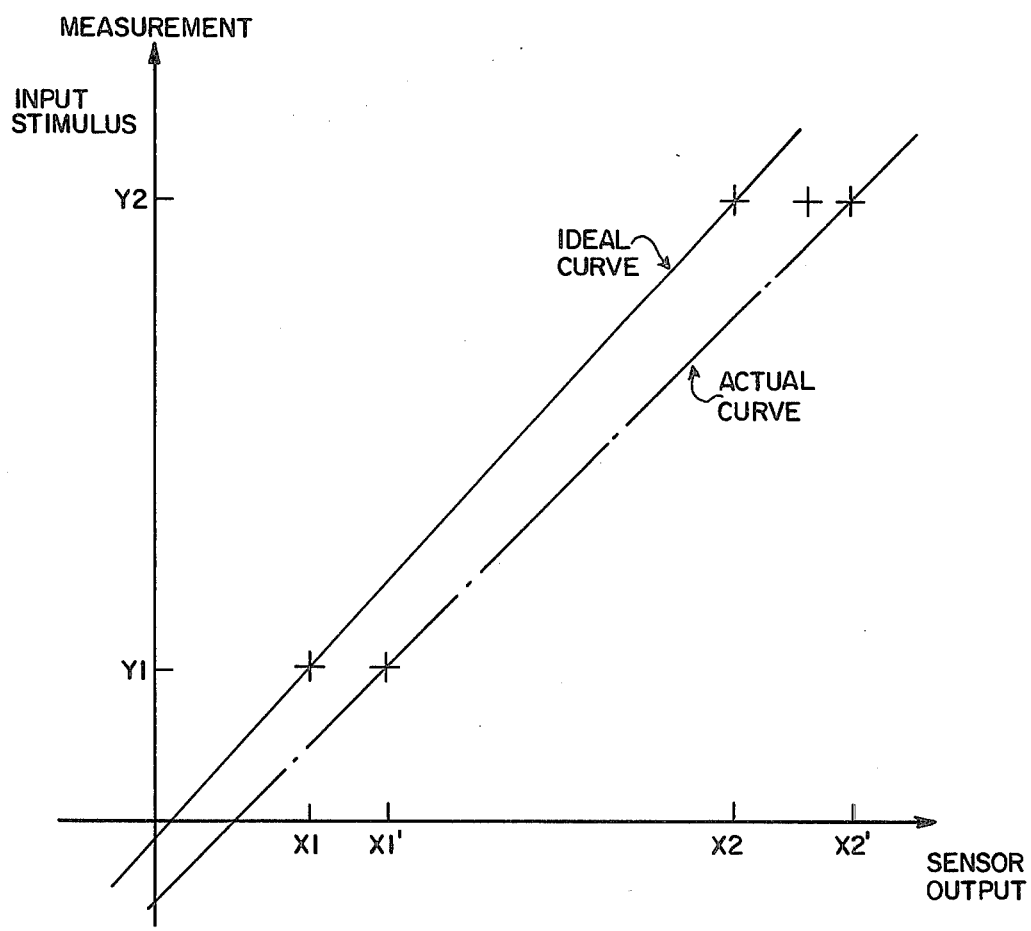

United States Patent [19]

Townzen

[11] Patent Number: 4,481,596
[45] Date of Patent: Nov. 6, 1984

[54] METHOD OF AND APPARATUS FOR AUTOMATICALLY COMPENSATING FOR VARIATIONS IN OUTPUT RESPONSE CHARACTERISTICS OF SENSORS AND THE LIKE

[75] Inventor: David Townzen, Winchester, Mass.

[73] Assignee: Kaye Instruments Inc., Bedford, Mass.

[21] Appl. No.: 316,999

[22] Filed: Nov. 2, 1981

[51] Int. Cl.$^3$ .............................................. G01K 7/10
[52] U.S. Cl. .................................. 364/571; 364/557; 374/169; 374/172
[58] Field of Search ............... 364/571, 573, 575, 550, 364/557; 73/359 AR

[56] References Cited

U.S. PATENT DOCUMENTS

| | | | |
|---|---|---|---|
| 4,084,248 | 4/1978 | Scott | 364/571 |
| 4,089,058 | 5/1978 | Murdock | 364/571 |
| 4,161,782 | 7/1979 | McCracken | 364/571 |
| 4,179,745 | 12/1979 | Wuertele | 364/557 X |
| 4,211,113 | 7/1980 | Harrison | 364/557 X |
| 4,246,641 | 1/1981 | Babil et al. | 364/571 |
| 4,253,155 | 2/1981 | Freiday et al. | 364/571 |
| 4,303,984 | 12/1981 | Houvig | 364/571 |

Primary Examiner—Edward J. Wise
Attorney, Agent, or Firm—Rines and Rines, Shapiro and Shapiro

[57] ABSTRACT

This disclosure is concerned with a novel technique for automatically fitting the output response characteristic curve of a measurement sensor to that of an ideal or reference sensor through determination of output variations in response to the same input stimulus near one end or point of the curve, storing the differences for automatic correction of the measurement sensor output by effectively superimposing the curves at such end, determination of output variations at another end or point of the curve, and effectively relatively pivoting the measurement sensor output curve about the said one end to cause substantial superposition of the other end or point of the curve and the span therebetween, thereby to provide stored signals for automatically correcting the output response of the measurement sensor, when in subsequent measurement use, over the complete characteristic response curve between its ends or selected points.

14 Claims, 4 Drawing Figures

METHOD OF AND APPARATUS FOR AUTOMATICALLY COMPENSATING FOR VARIATIONS IN OUTPUT RESPONSE CHARACTERISTICS OF SENSORS AND THE LIKE

The present invention relates to methods of and apparatus for automatically compensating for variations in output response characteristics of sensors and the like, being more particularly directed to the determination of variations of a measurement sensor signal output characteristic response curve from that of an ideal reference or standard sensor, and the automatic storing and application of correction data to the measurement sensor during its subsequent measurement use.

Prior techniques for introducing corrections or otherwise calibrating measurement sensors to compensate for deviations in response characteristics from desired characteristics of a standard sensor have largely required individual manual adjustment, such as zeroing or offsetting electrical components to introduce an appropriate standard starting point. Fine adjustments and tuning have been required to try to compensate for deviations in other parts of the output response than the initial zeroing. As an example, reference may be made to a bridge circuit calibration system for sensors of the assignee of the present invention, Kaye Instruments, Inc., a Model BC-8 Bridge Conditioner which provides individual potentiometers in a bridge circuit arrangement to enable zero and span calibrations for each sensor being used. The calibration procedure involves manual adjustment of these potentiometers, is time-consuming, and requires considerable skill to obtain valid results. Since individual bridge circuits must be provided for each sensor, the cost of the measurement system is increased accordingly. This type of equipment, moreover, is only suited to sensors the output of which is represented by a change in resistance as a function of the measurement being made (e.g., strain gauge, RTD, etc.). Other types of sensors, such as thermocouples, however, may not be directly used with bridge conditioners, and are thus not suitable for this type of compensation.

In accordance with the present invention, such and other disadvantages are remarkably overcome through the technique of effectively superimposing the output response characteristic curve (output signal as a function of input stimulus) of a measurement sensor upon that of an ideal reference or standard sensor, developing stored correction signals for effecting such superposition and that thenceforth automatically are applied to the measurement sensor output, in subsequent measurements use, to enable correction throughout the complete range of the output signal response characteristic of the measurement sensor.

An object of the invention, accordingly, is to provide a new and improved method of and apparatus for automatically compensating for variations from a desired ideal reference or standard in output response characteristics of sensors and the like that obviates the above prior art inadequacies and disadvantages and provides stored signal automatic correction capability for complete output signal response characteristic correction of the measurement sensor during its measurement use.

A further object is to provide a novel sensor calibrating and correcting technique of more general use, as well; and a novel and improved thermocouple apparatus embodying the invention.

Other and further objects will be hereinafter explained and are more particulalry delineated in the appended claims.

From one of its broader aspects, however, in summary, the invention embraces a method of compensating for variations in the output signal response characteristic curve of a measurement sensor to input stimuli from the output signal response of an ideal reference sensor, over an input stimuli range extending between two different-valued input stimuli, the method comprising, determining and storing signal variation in the output of the measurement and reference sensors in response to one-value input stimulus; applying the stored signal variation to the measurement sensor output, during measurement use, effectively to superimpose the measurement and reference output response characteristic curves at a first point corresponding to one-value input stimulus; determining and storing signal variation in the output of the measurement and reference sensors in response to a different-value input stimulus; applying the last-named stored signal variation to the measurement sensor output, during measurement use, effectively relatively to pivot said characteristic curves about said first point substantially to superimpose the said characteristic curves at a second point corresponding to said different-value input stimulus and over the span therebetween, thereby automatically to correct the output response of the measurement sensor, in subsequent measurement use, over the complete characteristic response curve over the domain connecting said first and second points. Preferred details and best mode embodiments are later presented.

Figure 1B:
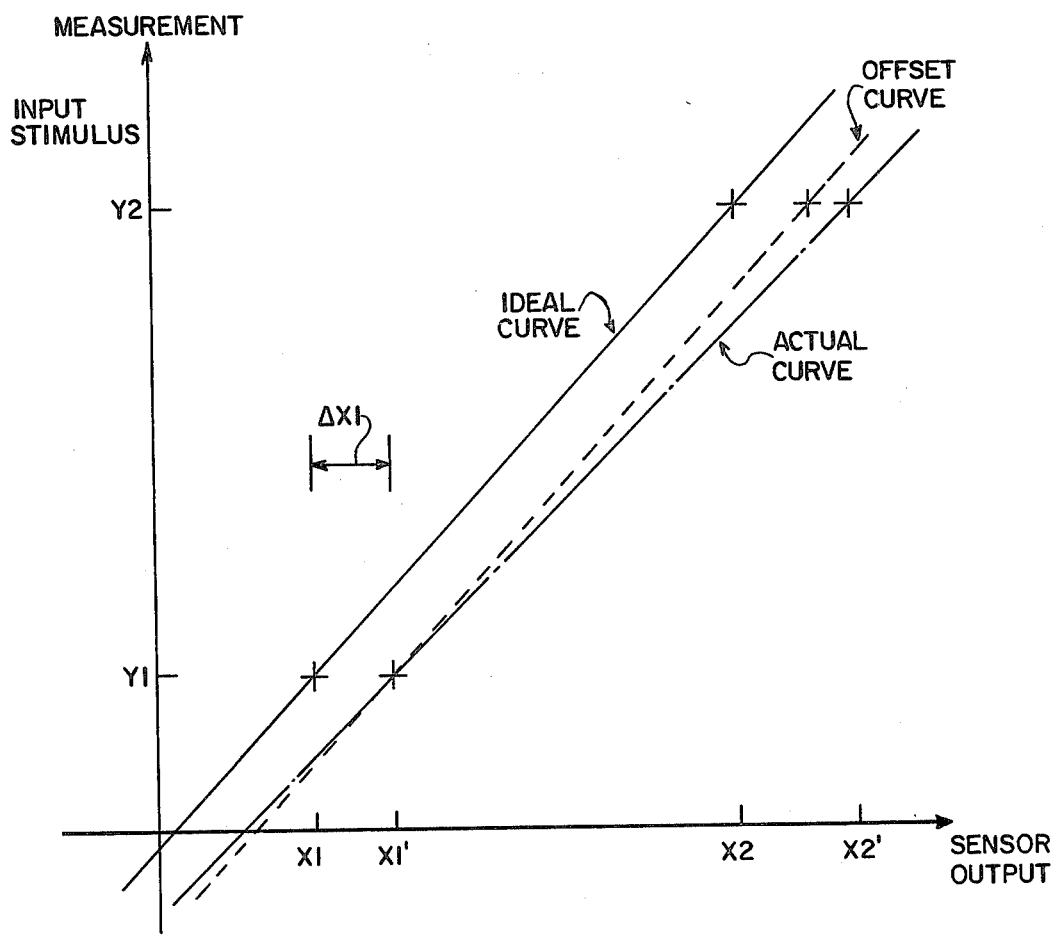
Figure 1C:
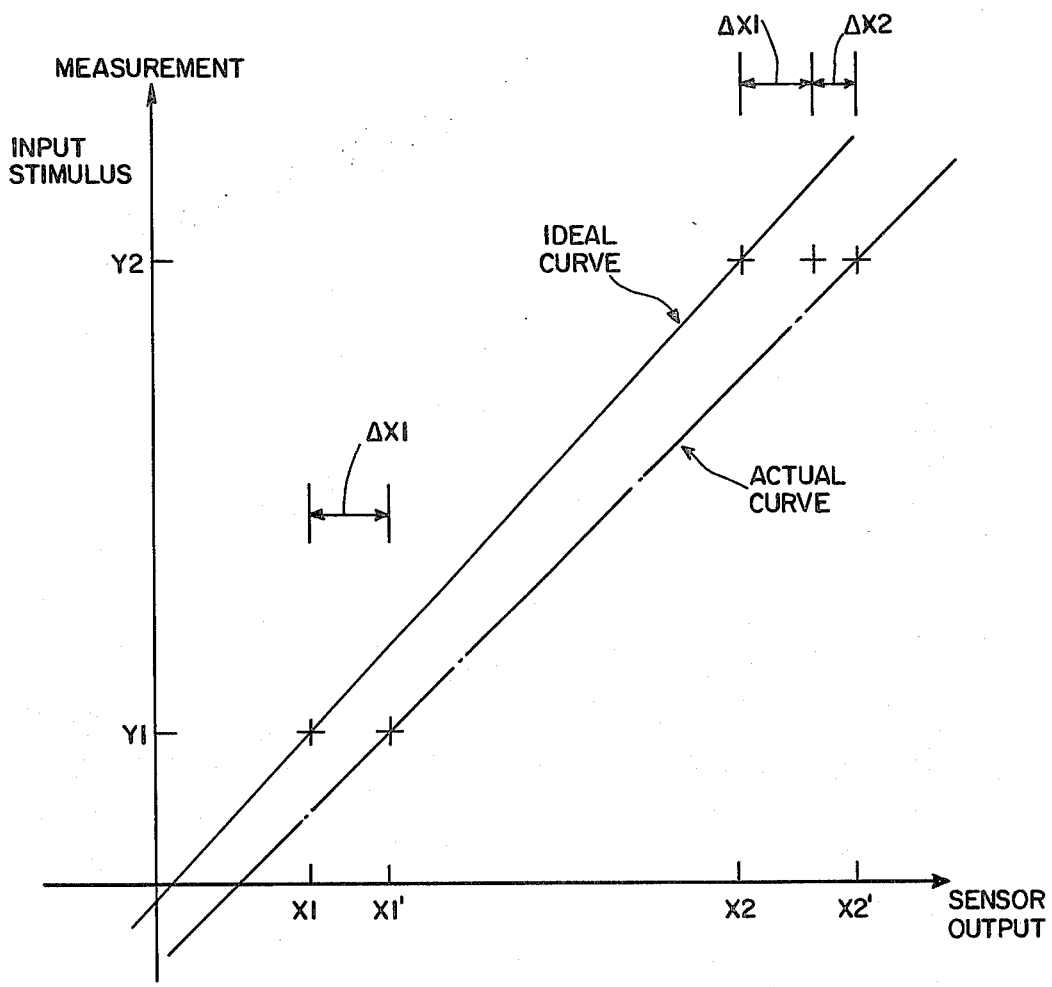
Figure 2:
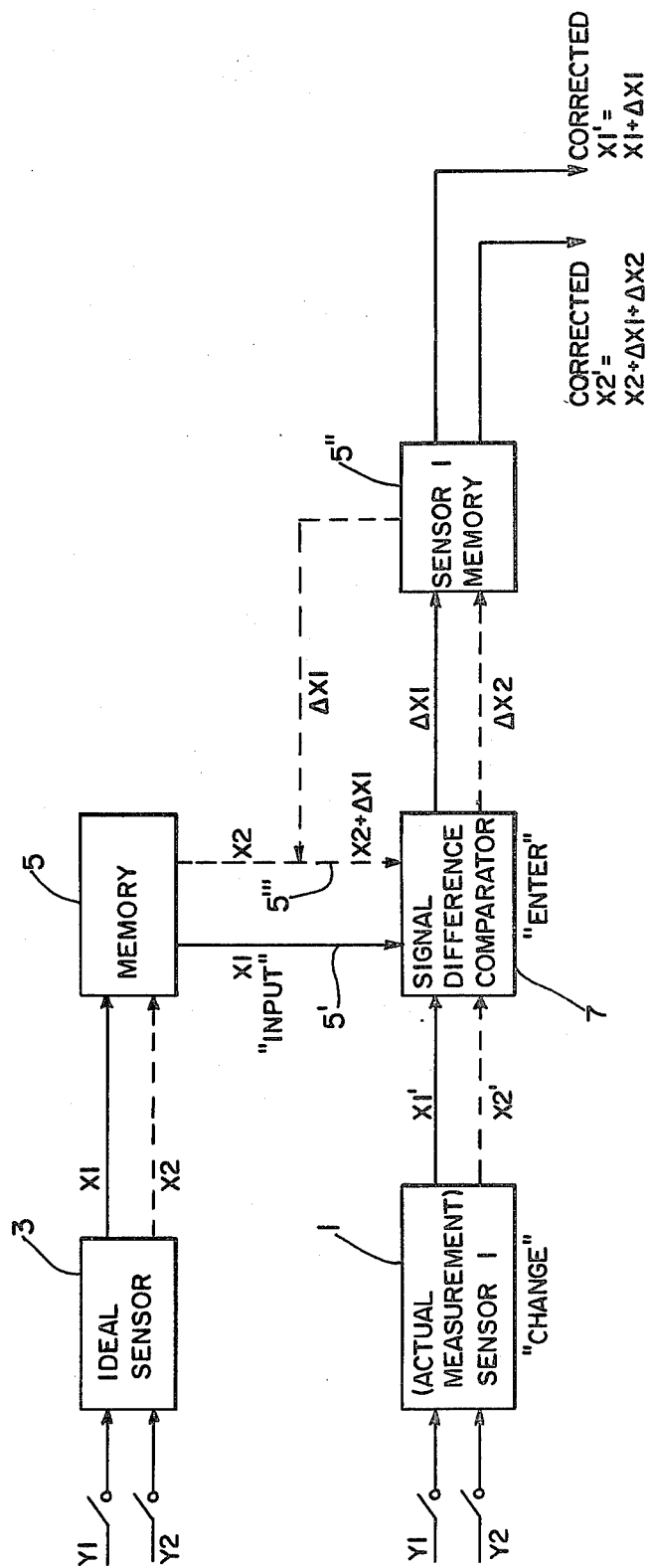

The invention will now be described with reference to the accompanying drawing,

FIGS. 1A–C of which are graphs illustrating the sensor output response characteristic superposition technique underlying the invention; and FIG. 2 is a combined block and flow diagram for implementing the same in preferred form.

Referring to FIG. 1A, the invention is first illustrated in connection with its application to a current-transmitter pressure-type sensor, such as a strain gauge (for example, of the Action-Pack Model or type TP690, of Action Instruments, Inc.), though the invention is generally applicable to all types of sensors and similar devices. As shown, the "IDEAL" sensor provides a voltage output characteristic response curve (voltage plotted along the abcissa), which is a linear function of the pressure being measured (plotted along the ordinate). In particular, a sensor output of X1 volts corresponds to an input pressure stimulus of value Y1; and a sensor output of X2 corresponds to a pressure Y2. FIG. 1A also shows a typical curve (dash-dot) for an "ACTUAL" sensor to be used for measurements and in which a sensor output X1' corresponds to the output actually obtained for a stimulus pressure Y1; and a sensor output X2' corresponds to pressure Y2—quite different values from or at variance with the "IDEAL" curve between the selected lower and upper measurement pressure points Y1 and Y2.

In accordance with the method underlying the invention, the first steps in the automatic calibration procedure consist of the following sequence. Output responses X1 and X2 of an ideal (or standard or reference) sensor 3 in FIG. 2, corresponding to input stimuli Y1 and Y2, respectively, are stored in memory at 5. The actual sensor to be used for measurement purposes, so-labeled at 1 in FIG. 2, is provided with a reference input or stimulus corresponding to the lower-value calibration point Y1. The operator effects a step labeled "INPUT", which causes the stored value X1 from memory 5 to be recalled at 5'. A step called "CHANGE" is then effected which causes the actual sensor 1 to respond to its input pressure Y1 and to produce an output X1'. The outputs X1' and X1, under an "ENTER" step, are applied to a difference comparator 7 of well-known type for determining the signal variation or difference between X1' and X1 and causing such difference, $\Delta X1=X1'-X1$, to be calculated and stored in memory 5" for that particular sensor 1. As shown in FIG. 1B, the result of this calibration of the first stimulus point Y1 is an "OFFSET" so-labeled (dash curve) corresponding to the solid-line ideal curve, such that a sensor output of $X1'=X1+\Delta X1$ provides the measurement of the stimulus Y1. While this makes measurements in the lower portion of the curve in the vicinity of Y1 more accurate, however, the slope of the actual measurement sensor characteristic may vary markedly from the "IDEAL" characteristic, as is shown by the increasing gap between the "OFFSET" and "ACTUAL" curves in FIG. 1B.

To obviate this variation, a second part of the automatic calibration procedure of the invention is then effected. The sensor 1 is now subjected to a reference stimulus corresonding to calibration point Y2. The operator effects the before-described "INPUT" step of FIG. 2, this time causing the stored value $X2+\Delta X1$ to be recalled at 5'''. The "CHANGE" step causes the actual sensor 1 to produce, in response to stimulus Y2, an output X2'. The "ENTER" step then causes the comparison of signal variation between outputs X2 and X2' and the determination of the difference $\Delta X2=X2'-(X2+\Delta X1)$ to be calculated at 7, and stored in memory at 5" for that particular sensor 1. As shown in FIG. 1C, the result of this calibration of the second point Y2 is to pivot the "OFFSET" curve of FIG. 1B about the lower curve portion or near low-end point (X1; Y1) such that an output of $X2'=X2+\Delta X1+\Delta X2$ is provided for the measurement of input stimulus Y2, while retaining the sensor output $X1'=X1+\Delta X1$ for measurement of Y1. Mathematically, the measurements Y corresponding to sensor outputs X are calculated according to the following formula:

$$Y = [X - (X1 + \Delta X1)] \frac{(Y2 - Y1)}{[(X2 + \Delta X2) - X1]} + Y1.$$

When the stored corrections are automatically added to the output of the measurement sensor 1, in use, the "ACTUAL" or measurement sensor characteristic response curve has effectively been substantially superimposed upon the "IDEAL" curve through this technique of effective superposition of the output responses of the lower-value stimulus Y1, and pivoting about the same to effect the superposition of the output responses at the upper Y2 stimulus end and the intermediate gap or span or domain between the upper and lower ends or selected points of the characteristic response curve.

In the case where the sensor output is not a linear function of measurement, such as where thermocouple sensors are used to measure temperature stimuli, the invention provides for non-linear microvolt-to-temperature linearization conversion, as by a conventional linearizing amplifier or network (not shown) following the sensors 1 and 3 of FIG. 2, and then the resulting calibration procedure described above. Convenient low- and high-valued input temperature calibration points Y1 and Y2 are the freezing and boiling temperatures of water at standard atmospheric pressure, or the like.

While well-known memory and computational circuits may be employed to practice the invention, suitable memory components 5, 5" in FIG. 2 include the NEC uPD 444/6514 Random Access Memory, with the signal difference circuit 7 being, for example, of the Intel type 8231 Arithmetic Processing Unit.

Further modifications will also occur to those skilled in the art, including, if desired, the use of time-averaging circuits (not shown) in the sensor outputs, and such are considered to fall within the spirit and scope of the invention as defined in the appended claims.

What is claimed is:

1. A method of compensating for variations between the output signal response characteristic curve of a measurement sensor and the output signal response curve of an ideal reference sensor, wherein the curves indicate the output signal response for different input stimuli, said method comprising providing a first-value input stimulus; determining and storing a first signal variation between the output signal of the measurement sensor and the output signal of the reference sensor for said first-value stimulus; substantially superimposing said characteristic curves at a first point thereon to compensate for said first signal variation; providing a second-value input stimulus; determining and storing a second signal variation between the output signal of the measurement sensor and the output signal of the reference sensor for said second-value input stimulus; relatively pivoting said characteristic curves about said first point so as to substantially superimpose said curves at a second point to compensate for said second signal variation; and thereafter, dependent upon said superposition of curves, automatically correcting the output signal of the measurement sensor, in subsequent measurement use, so as to compensate for the variations between the actual measurement sensor output signal and the ideal reference sensor output signal for input stimuli in the range between said points.

2. A method as claimed in claim 1 and in which the sensor output signal responses are initially substantially linearized before said determining and storing steps.

3. A method as claimed in claim 1 and in which said determining steps include time-averaging the measurement sensor output signals.

4. A method as claimed in claim 1 and in which said first-value input stimulus is a low value stimulus and said second-value input stimulus is a relatively high value stimulus, and in which each of said determining and storing steps comprises comparing the output signal of the measurement sensor to the output signal of the reference sensor to obtain the difference therebetween and storing the difference.

5. A method as claimed in claim 4 and in which the output signals of said measurement sensor are time-averaged and the time-averaged values thereof are used for obtaining said difference.

6. A method as claimed in claim 1 and in which the sensors are temperature-responsive sensors and each of the output signal response characteristic curves represents output signal versus input temperature stimulus, and in which said first-value and second-value stimuli are, respectively, temperatures substantially at the freezing and boiling points of water or the like at standard atmospheric pressure.

7. Apparatus for compensating for variations between the output signal response characteristic curve of a measurement sensor and the output signal response curve of an ideal reference sensor, wherein the curves indicate the output signal response for different input stimuli, said apparatus comprising, in combination, means for inputting a first-value input stimulus; means for determining and storing a first signal variation between the output signals of the measurement sensor and the output of the reference sensor for said first-value stimulus and for substantially superimposing said characteristic curves at a first point thereon to compensate for said first signal variation; means for inputting a second-value input stimulus; means for determining and storing a second signal variation between the output signal of the measurement sensor and the output signal of the reference sensor for said second-value input stimulus and for relatively pivoting said characteristic curves about said first point so as to substantially superimpose said curves at a second point to compensate for said second signal variation; and means dependent upon said superposition of curves for automatically correcting the output signal of the measurement sensor, in subsequent measurement use, so as to compensate for the variations between the actual measurement sensor output signal and the ideal reference sensor output signal for input stimuli in the range between said points.

8. Apparatus as claimed in claim 7 and in which substantially the following relationship is established between the input stimulus Y and the output response X as measured by the said measurement sensor:

$$Y + [X - (X1 + \Delta X1)] \frac{(Y2 - Y1)}{[(X2 + \Delta X2) - X1]} + Y1,$$

where X1 and X2 are the output responses of an ideal reference sensor to stimuli Y1 and Y2, respectively, and $\Delta X1$ and $\Delta X2$ are differences from X1 and $(X2 + \Delta X1)$ in the output responses for respective stimuli Y1 and Y2 produced by the said measurement sensor.

9. Apparatus as claimed in claim 7 and in which means is provided for initially substantially linearizing the sensor output signal responses.

10. Apparatus as claimed in claim 7 and in which means is provided for time-averaging the measurement sensor output signals.

11. Apparatus as claimed in claim 7 and in which said first-value input stimulus is a low value stimulus and said second-value input stimulus is a relatively high value stimulus, and in which each of said determining and storing means comprises means for comparing the output signal of the measurement sensor to the output signal of the reference sensor to obtain the difference therebetween and means for storing the difference.

12. Apparatus as claimed in claim 10 and in which means is provided for time-averaging the output signals of said measurement sensor and for connecting the time-averaged values thereof to said comparing means.

13. Apparatus as claimed in claim 7 and in which the sensors are temperature-responsive sensors and each of the output signal response characteristic curves represents output signal versus input temperature stimulus.

14. Apparatus as claimed in claim 12 and in which said sensors are of the thermocouple type and said first-value and second-value stimuli are, respectively, temperatures substantially at the freezing and boiling points of water or the like at standard atmospheric pressure.

* * * * *